US006522422B1

(12) United States Patent
Klingler et al.

(10) Patent No.: US 6,522,422 B1
(45) Date of Patent: Feb. 18, 2003

(54) CONTROL COMPUTER FOR A PRINTING MACHINE

(75) Inventors: Horst Klingler, Muhlheim/Main (DE); Hans-Martin Reinert, Wachtersbach (DE); Johannes Tenfelde, Grosskrotzenburg (DE); Karsten Wendt, Obertshausen (DE); Matthias Zoll, Mainz (DE); Sven Olaf Cabus, Frankfurt (DE); Gerold Wende, Frankfurt (DE); Michael Hess, Mainz-Kastel (DE); Heiner Sirowitzki, Wiesbaden (DE); Heiner Schilling, Darmstadt (DE)

(73) Assignee: MAN Roland Druckmaschinen AG (DE)

( * ) Notice: Subject to any disclaimer, the term of this patent is extended or adjusted under 35 U.S.C. 154(b) by 0 days.

(21) Appl. No.: 09/283,527

(22) Filed: Apr. 1, 1999

(30) Foreign Application Priority Data

Apr. 4, 1998 (DE) ........................................ 198 15 185

(51) Int. Cl.[7] ............................................... G06F 15/00

(52) U.S. Cl. ..................................... 358/1.15; 358/1.14

(58) Field of Search ................................ 358/1.1, 1.13, 358/1.14, 1.15, 1.16, 1.18, 523, 402, 404; 710/5, 6, 7, 14, 15, 16, 17, 20–21, 39, 44, 58–62

(56) References Cited

U.S. PATENT DOCUMENTS 5,638,498 A * 6/1997 Tyler et al. ................ 358/1.16
6,111,655 A * 8/2000 Kashihara et al. ......... 358/1.18

FOREIGN PATENT DOCUMENTS

| | | |
|---|---|---|
| EP | 0 270 871 | 6/1988 |
| EP | 0 728 581 A2 | 2/1995 |
| EP | 0 755 786 B1 | 1/1997 |

* cited by examiner

*Primary Examiner*—Arthur G. Evans
(74) *Attorney, Agent, or Firm*—Leydig, Voit & Mayer, Ltd.

(57) ABSTRACT

A computer controlled sheet-fed offset printing machine is described which includes an Interpreter-program for obtaining an image of the signal-state of specified interfaces of the many interfaces that are needed for the operation of the computerized printing press. The Interpreter-program has access to a reserved region of memory for storing and manipulating, if desired, the image of the signal-state. Furthermore, the Interpreter-program has very limited and defined access to the inputs and resources used by the control programs used to operate the computerized printing press. This ensures that the control programs can execute in real-time unaffected by the execution of the Interpreter-program while data is acquired by the Interpreter-program while the computerized printing press is in operation. The Interpreter-program can execute diagnostic routines and provide data for detecting and correcting errors that are otherwise hard to localize in a complex system with complex software.

20 Claims, 5 Drawing Sheets

CONTROL COMPUTER FOR A PRINTING MACHINE

This application claims priority from the German Application No. 198 15 185.3 filed on Apr. 4, 1998.

TECHNICAL FIELD

The invention relates to the field of automated electronically controlled printing presses and more particularly, means for ensuring reliability of computer controlled sheet-fed offset printing presses by efficiently potential and real shortcomings.

BACKGROUND OF THE INVENTION

The course of development in printing technology continues to move away from separate optimization of mechanical and electronic components and increasingly follows the path of improving cooperation between these two divisions. Formerly, the field of printing press electronics could be described as being insular, i.e. the press is provided with printing plates, paper, ink and other consumer materials, and the role of electronics is confined to providing support for the mechanical components of the printing press. Thus, efforts to achieve better quality, shorter running times or reduction in spoilage, for example, are made by using a greater number of sensors and more intelligent electronics.

In this disclosure a computer-controlled printing press may be considered to include computer controllers, each such controller having processors, memory, BIOS and operating system as is usual and available. In addition, this computer controller has interfaces with the printing press hardware, whether in the form of sensors or actuators, and also a variety of diagnostic routines, control programs and interfaces with operators/maintenance-persons.

A typical printing press may have several printing units controlled by local electronic controllers, typically computers, and these local controllers may be in turn connected to a central computer or to each other. Alternatively, there may be a single central controller monitoring and managing several printing units. In either case, it is not unusual for each sensor or actuator to have at least one control and one data connection to an electronic control. Similarly, actuators require data and control lines so that the electronic controller may learn about the state of the device and command it to put into effect the desired action.

Typical sensors include devices for sensing position, rotational or linear velocity, acceleration, torsion, transmitted or reflected light, ink level detectors, temperature, voltage, current and connectivity detectors and the like. Similarly, actuators include ink dispensing devices, electric motors, magnetic devices, light emitting devices, heating/cooling devices, hydraulic devices, valves, switches and the like.

Now, electronics has advanced to the point of not just being a supporting player in the design and operation of printing presses, but being an integral part of printing presses. Printing presses of today have a very large number of sensors and actuators that have to be controlled precisely to deliver the high quality and economical products to which we have become accustomed.

A single printing unit may have as many as 20 to 54 ink adjusting units. There are several interfaces to send to and receive signals from a large number of actuators and sensors and to test for the integrity of the connections as well. Not surprisingly, electronic controllers may have to control several hundred sensors and actuators in course of loading printing plates, dispensing of ink, selection and feeding of paper and carrying out defined production runs with feedback controls on the quality of the printed product to ensure high quality and low cost.

However, this state of affairs also means that due to the increased complexity the cost of printing presses has been increasing as well. Such costs are realized both in the absolute cost of a printing press and the cost of breakdowns and maintenance associated with a complex piece of machinery.

A large number of sensors and procedures are designed to detect errors and fault conditions to avoid expensive damage and waste. Many patents describe systems for detecting such fault conditions. For example, U.S. Pat. No. 5,730,053, assigned to Man Roland Druckmaschinen AG of Germany, describes a bus system for an electronically controlled printing press such that the integrity of the bus system and its tolerance to signal strength is tested automatically. Even with specific mechanisms to diagnose and, on occasion, correct errors arising from improper cabling setup, cross-talk, wear and tear, component malfunction, gear play, slow response times and the like, printing presses remain susceptible to other errors.

Electronic controls contribute their own set of errors, in part, due to system complexity. It is not possible to test for the robustness of every possible configuration of each and every sensor and actuator. Furthermore, many software routines may have errors that come to light only when a particular task has to be performed. Not surprisingly, debugging of complex software to achieve perfect reliability is an unsolved problem at present.

Some software errors may be subtle enough that they do not justify disrupting a production run, but may still demand attention in order to optimize the operation of the printing press. Addressing such errors requires knowledge of the conditions that precipitated the particular error condition in order that special tools may be used to localize and correct the errors. An example of the peculiar difficulties presented by complex systems is the difficult to isolate and correct but, nevertheless, known coding error termed Y2K.

In other instances, efficient fault location and correction often requires a detailed knowledge of the configuration leading to the fault condition. Prior art does not provide tools and efficient mechanisms for collecting relevant configuration information.

EP 0 755 786 A1 discloses a means for controlling a printing machine. The '786 application discloses a controller in a decentralized configuration and with the system having a common bus via which the various computers in the system communicate. Furthermore, a service computer can access the various control computers and perform checks and updates as needed via this bus as well. In the event of a program crash the cause of the crash may be investigated by using a special service computer, but with the disadvantage that the precise conditions leading to the crash cannot be replicated.

Another application, EP 0 728 581 A2, discloses a bus system in a printing machine where tests of the bus system are possible, even to the extent of determining the transfer reserve of the bus. But software errors are not easily analyzed in such a system because the testing is limited to the bus hardware capabilities, particularly when powering up.

Another application, EP 0 270 871 A2, describes a printing machine where the input or output signals of a digital control system may be examined separately. While the output circuit and faults therein can be monitored, and even errors due to cabling detected, the effect of such faults on the software is not readily detected. Furthermore, the printing press is still susceptible to faults due to a particular configuration.

The invention described herein overcomes these limitations in the prior art and provides for further improvements in printing presses and their operation.

SUMMARY OF THE INVENTION

The invention disclosed here comprises a software program called an interpreter-program for collecting data from a control computer or an interface even when the computer-controlled printing press is operating. The interpreter-program does not interfere with the real-time performance of either the printing press or the control computer and associated control programs. Furthermore, the interpreter-program is isolated from the rest of the control computer by means of run-time encapsulation thus permitting defined and rather limited access. This in turn reduces the chances of unforeseen errors and makes the system more robust.

Collecting data in course of actual operations is desirable since many of the expected errors, in particular software errors, may be expected to become noticeable in a particular configuration of the various components of the rather complex printing press. Thus, it is possible that a particular angle of a motor shaft in combination with a system configuration may have a tendency to enhance a possible error. Proper diagnosis of such an error would benefit from information about the precise configuration.

At the same time it is not desirable to monitor and store each and every possible state of the printing machine since this is both economically wasteful and impractical.

The interpreter-program is envisaged to be latent in most embodiments. It occupies a protected area of the system memory and is not active unless called upon to monitor some aspect of the printing press, such as an interface of interest. The activation of the interpreter-program may be via an interface to the interpreter-program and may be effected by either an operator or a system fault and the like depending on the particular embodiment. The functions of the interpreter-program may be better understood by the following description of some of the many benefits made possible by the invention.

It is an object of this invention to collect information from specified interfaces to facilitate monitoring in a computer-controlled printing press.

It is another objective of this invention to collect information from specified interfaces to facilitate fault detection in a computer-controlled printing press.

It is another objective of this invention to collect information from specified interfaces in a computer-controlled printing press to facilitate fault localization.

It is another objective of this invention to collect information from specified interfaces in a computer-controlled printing press without adversely affecting the real-time functioning of the printing press.

It is another objective of this invention to collect information from interfaces in a computer-controlled printing press to provide data for simulating the operation of the printing press.

It is yet another objective of this invention to collect data about the state of the control programs without modifying the runtime environment of the control programs.

It is yet another objective of this invention to permit execution of a run-time encapsulated diagnostic program in a computer-controlled printing press while the printing press is functioning.

It is yet another objective of this invention to facilitate collection of data pertinent to the state of a computerized controller in a computer-controlled printing machine for subsequent analysis on another special purpose computer or by another program.

It is yet another objective of this invention to facilitate collection of relevant data in a distributed control system for a printing press.

It is yet another objective of this invention to facilitate investigations into the state of selected parts of a printing press to further optimize the operation of printing presses.

It is yet another objective of this invention to facilitate service calls while a printing press is in operation.

DETAILED DESCRIPTION OF THE DRAWINGS

Controllers of printing machines have one of more control computers connected via buses to actuators, sensors, or other final control elements. In the case of decentralized controllers, the individual units of the printing machine are assigned control computers, the functions arising in respective units being executed by the individual computers. The control electronics of printing machines—taking the form of a central or decentralized controller—has to perform a multitude of complex tasks. For carrying on these tasks the control computers of printing machines are connected to a plurality of sensors and other operating elements. Thus, specific signals have to be emitted in concert with the operating state of the sensors/operating elements.

Owing to the complex control software of such systems, there are repeatedly instances in which malfunctions in the software sequence of the controller (software bugs) are activated because of a chance combination of transmitters, sensors, timer states, contents of variables etc., possibly even the individual habits of an operator. Such malfunctions can result in costly and time consuming service calls. Furthermore, such malfunctions cannot be detected with certainty with sophisticated system tests thus making it necessary that the precise cause of such a malfunction be established as quickly as possible.

Figure 1:
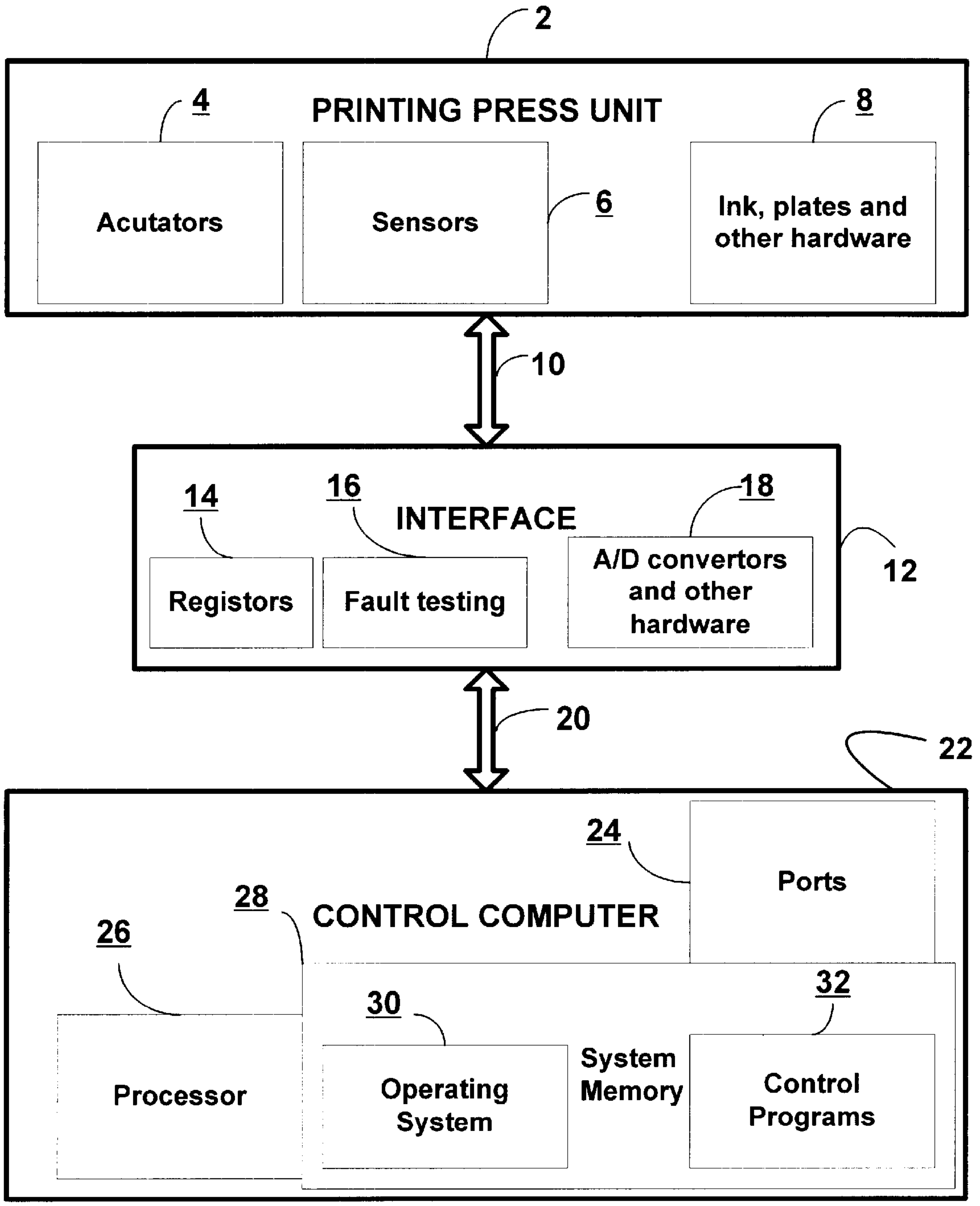
Figure 1 (prior art)
FIG. 1 illustrates a very general overview of a prior art computer-controlled printing press.

FIG. 1 shows a schematic of a prior art computer-controlled printing press. For convenience only one printing press unit 2 is shown with actuators 4, sensors 6 and ink, plates and other hardware 8. The printing press unit 2 can communicate via a connection 10 with an interface 12, which may have registers 14, fault testing means 16 and A/D converters and other hardware 18. Printing press to computer interface 12 is further connected by a bus or other communicating means 20 to a control computer 22 having ports 24, processor 26, system memory 28, operating system 30 and control programs 32.

The connection 10 between the printing press unit 2 and the interface 12 may be digital or analog as, for instance, described in the U.S. Pat. No. 5,101,474 ("'474 patent") and assigned to Man Roland Druckmaschinen AG of Germany.

Figure 2:
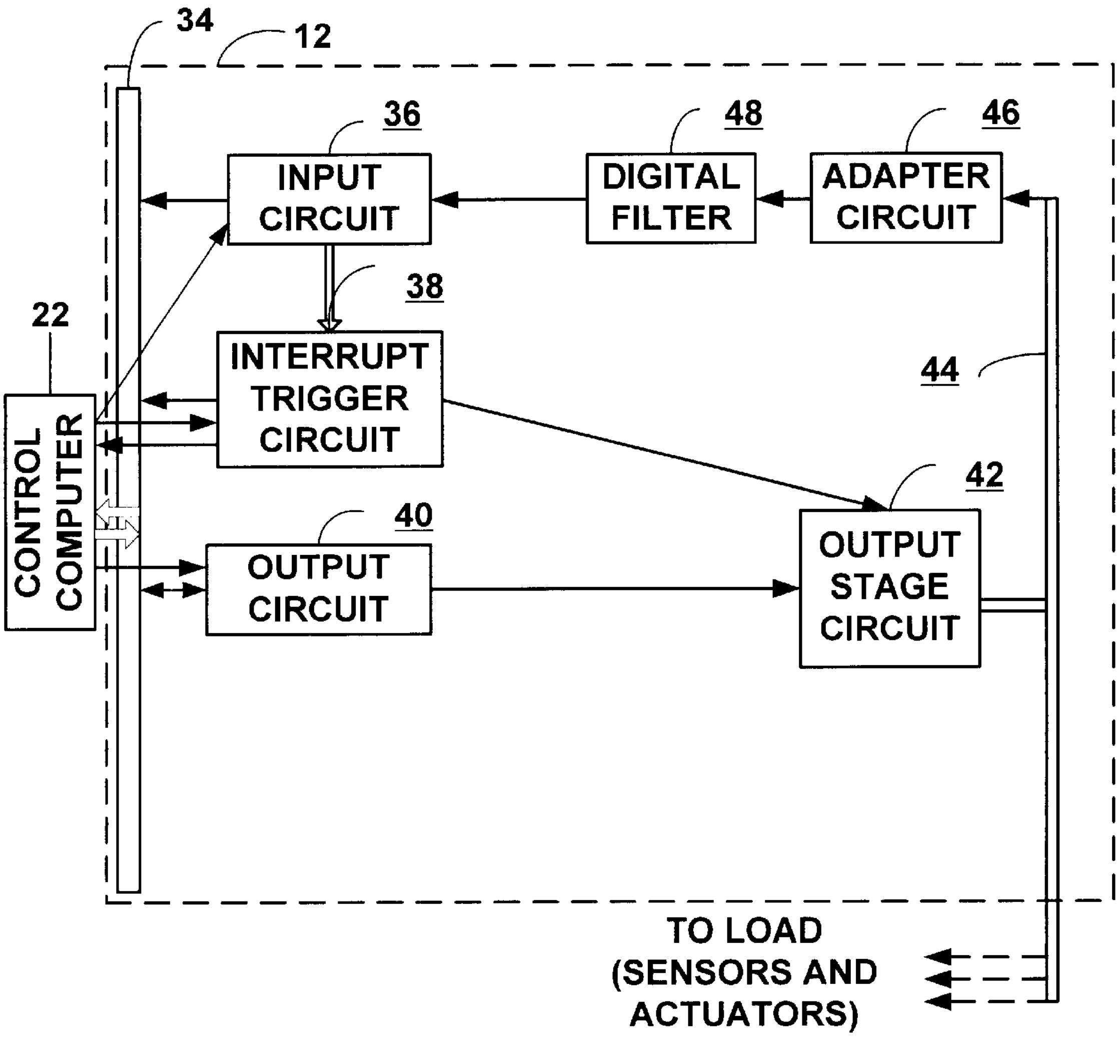
FIG. 2 shows an illustration of a possible interface with circuits for receiving and sending signals from hardware devices operating at voltages that are unsuitable for digital devices.

FIG. 2 illustrates a possible arrangement for some of the components in the interface 12. Control computer 22 is connected to a bus 34 and to an input circuit 36, an interrupt trigger circuit 38 and an output circuit 40. The output circuit 40 is connected to an output stage circuit 42 which modifies the voltages to a level suitable for the sensors and actuators under the control of the control computer 22. The input from the sensors and actuators is received on a bus 44 and then directed to an adapter circuit 46 which reduces the voltages to a level suitable for the operation of conventional digital devices. The signals from the adapter circuit 46 are further cleaned by a digital filter 48 to remove error causing transient etc. before being made available to the input circuit 36. It should be noted that the actual output can be monitored in this arrangement since bus 44 receives the output as well.

The input circuit can be accessed by the control computer 22 and the interrupt trigger circuit 38. The interrupt trigger circuit 38 is activated if a short circuit or the failure of a hardware component is detected and could effect a shut down of the printing press by communicating with the control computer 22 and the output stage circuit 42.

As can be seen from the foregoing description there are several layers of protective mechanisms to protect against device failure, or noise due to transients (filtered by the digital filter 48), and the like. A more detailed description of the interface, illustrated in FIG. 2, can be found in the '474 patent.

Figure 3:
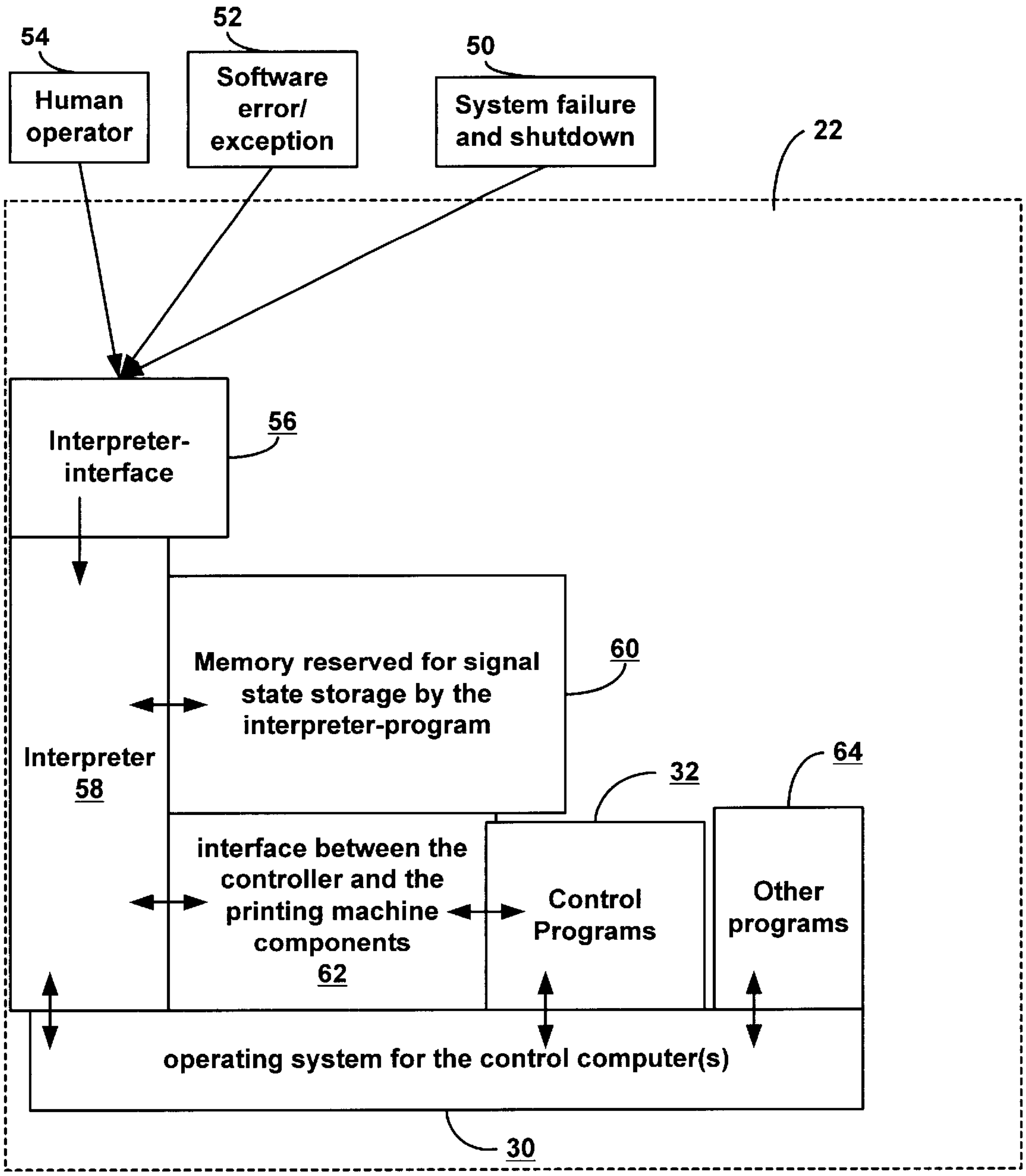
FIG. 3 is a flow diagram illustrating a possible operation of an interpreter-program, and in particular the invoking of the interpreter-program.

FIG. 3 illustrates a schematic of a control computer 22 implementing an embodiment of the interpreter-program. The control computer receives signals indicating system failure 50, software errors 52 or input from human operators 54. The memory of a control computer 22 includes an interpreter-interface program 56, which can activate an interpreter-program 58 as shown. The interface program 56 receives input generated by human operators 54, software errors 52 and system failure 50. It should be noted that the interpreter-interface program 56 could be implemented independent of the control computer 22 with no loss of generality.

The interpreter-program 58 does not execute unless it receives a command through the interpreter-interface 56. Such commands may take the form of code inputted by an operator or software exceptions or traps that the system requests the interpreter-program 58 to handle.

The interpreter-program 58 has very limited access rights and is encapsulated in its run-time environment. There is a reserved memory area 60 associated with the interpreter program 58 such that this memory is not available to other programs executed by the control computer 22. This ensures that the interpreter-program 58 is not itself a significant source of system instability. Thus, a crash of the interpreter-program 58 does not additionally compromise the performance of the printing machine.

Suitable commands to the interpreter-program 58 can generate diagnostic functions for monitoring, for instance, specified interfaces. Thus, the interpreter may read the input being received by the control programs 32 via the interfaces 62 and copy it to its protected space to create a signal-image in accordance with commands received by the interpreter-interface 56. It may be noted that, in general, other programs 64 being executed by the control computer 22 are also preferably isolated from the interpreter-program 58.

Further system stability is assured by imposing on the interpreter-program 58 the condition that it should not be able to interfere with the execution of the control programs 32. For instance, in a control computer with a WIN 32 based operating system this may be assured by assigning the interpreter-program 58 based process, a lower priority than that assigned to the processes and threads belonging to control programs 32. Thus, the interpreter-program is preempted by any of the control programs 32. This ensures that the presence and execution of the interpreter-program 58 does not adversely impact on the real-time performance of the printing machine.

Figure 4:
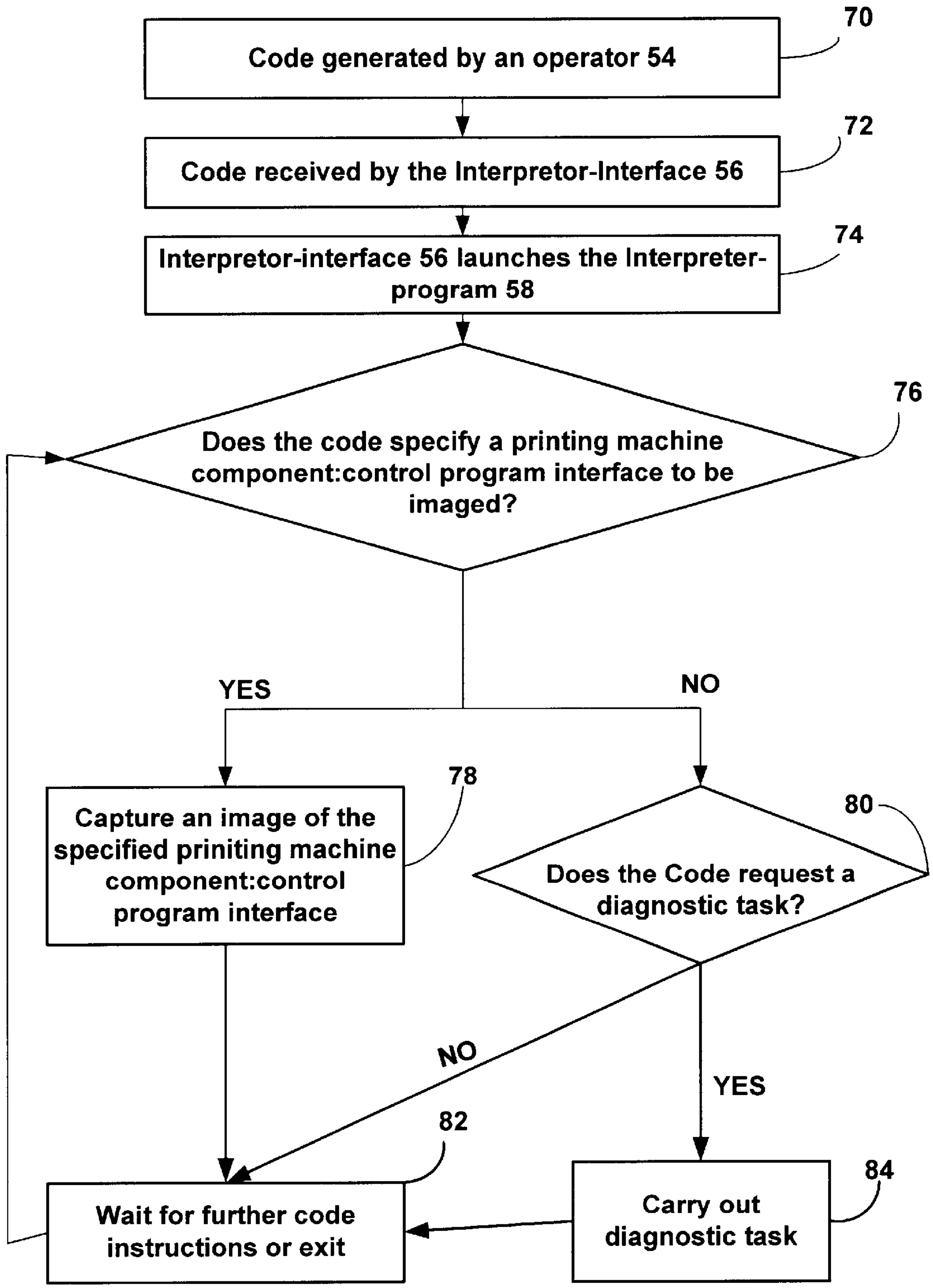
FIG. 4 shows a flow diagram illustrating a possible decision-making strategy to ensure that the interpreter-program does not compromise the real time performance of the computer-controlled printing press.

FIG. 4 illustrates the operation of a possible embodiment of the interpreter-program 58. For instance, code for activating/launching the interpreter is generated at step 70 by a human operator 54 and received by the interpreter-interface 56 at step 72 resulting in the launching/activation of the interpreter program at step 74. At step 76 control is passed to step 78 for capturing the signal-state of specified interfaces by employing suitable routines if the code so specifies. Else, control passes to step 80 where a decision is made if the code requires a diagnostic task to be performed. In the event of an error or cancellation of a task and the like, the interpreter-program 58 waits for further instructions or exits at step 82. Should the interpreter-program 58 be required to carry out a diagnostic task at step 80, control is transferred to step 84 for performing the task and subsequently the interpreter-program 58 goes to step 82 to wait for further instructions or exit.

The process described permits the capture of a signal-state image of an interface or another part of the printing process that is of interest. The signal-state image stored by the interpreter-program 58 may be analyzed with suitable programming tools independent of the operation of the printing press. In addition, extreme ranges for positioning drives, contents of variables, transmitter states etc. can be investigated without invoking the control programs. In effect, system behavior can be simulated based on the image stored by the interpreter-program 58.

The encapsulation of the interpreter-program 58 ensures that diagnostic routines may be executed even during a production run without the risk of causing system failure. Thus, it is possible, for example, to determine the angular values at which certain switching operations were initiated by the control computer 22 without affecting the real-time emission of corresponding switching signals.

Figure 5:
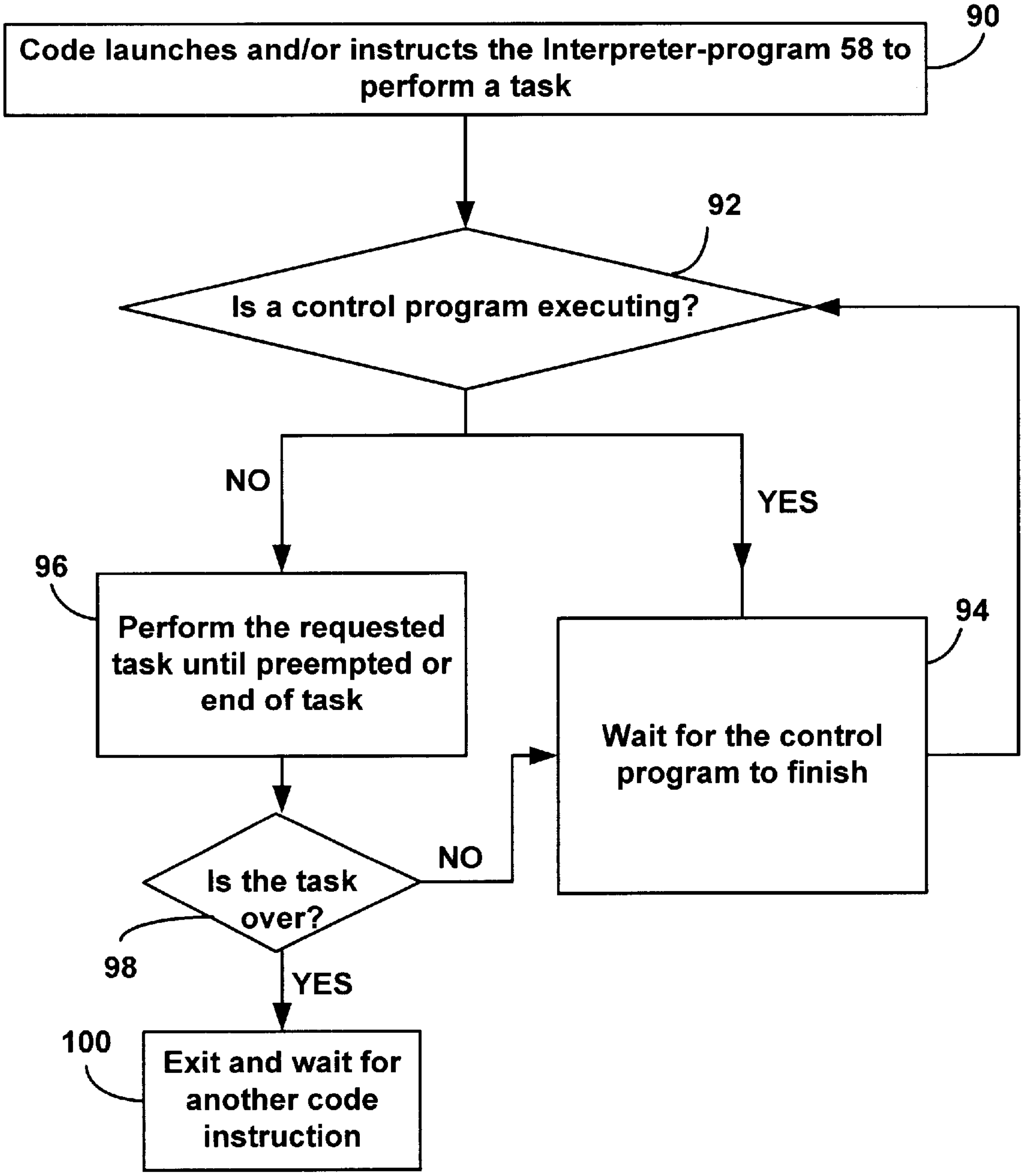
FIG. 5 is a block diagram illustrating the functioning of the interpreter-program relative to the other major tasks undertaken by a control computer.

FIG. 5 illustrates a particular embodiment of the interpreter-program 58 that ensures that the real-time performance of the printing press is not affected by the execution of the interpreter-program 58. At step 90 the interpreter-program 58 is launched and control passes to step 92 and the interpreter program 58 is placed in a wait state 94 if a control program 32 is being executed. In the event no control program 32 is being executed, the operating system 30 permits interpreter-program 58 to execute on the control computer 22 at step 96. If a control program 32 needs to execute, the execution of the interpreter-program 58 is preempted at step 96 passing control to step 98. The system determines whether the interpreter-program has finished executing at step 98 and permits the interpreter-program to exit at step 100. If the interpreter-program 58 has not finished executing, control is passed to step 94 from step 98 and the interpreter-program is placed in a waiting state at step 94 until the control computer is available again.

The interpreter-program 58, as described, makes additional interface programs unnecessary and avoids the risk of adverse interactions and disruptive collisions between such programs and a control program.

It should be further noted that, optionally, the interpreter-program 58 may be activated by the occurrence of a software error that, for instance, generates a need to handle exceptions and conditions. Even in the case of fatal errors the interpreter-program 58 may store data from the interfaces of interest. Similarly, hardware system failures may be configured to activate the interpreter-program as well. In these limited circumstances the interpreter program 58 would operate in course of a system shut-down. In some embodiments, the interpreter-program 58 may be permitted to handle fatal exceptions, due to for instance control programs 32, and initiate storing of system data and system shut-down.

But the interpreter-program 58 is likely to have read only privileges for accessing data structures with data relevant to the signal-state of the interfaces. Any modification in signal states is limited to manipulation of the signal-state image stored in the reserved memory area 60 accessible to the interpreter-program. This feature exploits the run-time encapsulation of the interpreter-program while ensuring system stability.

The operating systems in use today permit realization of embodiments of the interpreter-program as described, and regardless of a distributed versus a single control computer topology. Thus, the description above should not be construed to be limited to a particular operating system or computer topology.

The description above is intended to include departures from the specific designs and methods discussed above and that will suggest themselves to those skilled in the art without departing from the spirit and scope of the invention. The invention is not restricted to the particular constructions and embodiments described, but should be construed to cohere with all the modifications that may fall within the scope of the appended claims.

All of the applications and patents referenced in this disclosure are incorporated in their entirety, but should not be interpreted to be limiting the invention to the embodiments discussed herein.

What is claimed is:

1. A computer-controlled printing press comprising:

a plurality of printing units;

at least one bus for conveying signals to and from said printing units;

at least one computerized controller having at least one processor, a system memory, an operating system and a plurality of control programs for controlling said printing units;

at least one interface between said computerized controller and said bus; and an interpreter-program accessible to the computerized controller, where furthermore, the computerized controller allows execution of the control programs unaffected by the execution of the interpreter-program whereby ensuring real-time execution of the control programs.

2. The computer-controlled printing press of claim 1 where, furthermore, the computerized controller is connected to a plurality of sensors in the printing press, said sensors including position sensors, ink sensors, tension sensors, torsion sensors, voltage sensors, current sensors, light sensors and time sensors.

3. The computer-controlled printing press of claim 1 where, furthermore, the computerized controller is connected to a plurality of actuators in the printing press, said actuators being controllable by the computerized controller.

4. The computer-controlled printing press of claim 1 where the interpreter program may be programmed via the bus connecting the computerized controller to other printing units.

5. The computer-controlled printing press of claim 1 where the interpreter-program does not commence execution if a control program of the plurality of control programs is ready to execute.

6. The computer-controlled printing press of claim 1 where execution of the interpreter-program is preempted if a control program of the plurality of control programs is ready to execute.

7. The computer-controlled printing press of claim 1 where the interpreter-program copies selected data also used by the plurality of control programs.

8. The computer-controlled printing press of claim 7 where the selected data include a plurality of signals received from said sensors in said printing press.

9. The computer-controlled printing press of claim 7 where the selected data include a plurality of signals transmitted by the computerized controller to the actuators in the printing press.

10. The computer-controlled printing press of claim 7 where the selected data are copied by the interpreter-program to a reserved region of memory.

11. The computer-controlled printing press of claim 1 where the interpreter-program is activated via an interpreter-interface in response to a code, including service calls, received at the interpreter-interface.

12. The computer-controlled printing press of claim 11 where the code specifies an interface and wherein a signal-state of said interface is copied by the interpreter-program to form an image of the signal-state of the interface.

13. The computer-controlled printing press of claim 11 where the code specifies a diagnostic function to be performed by the interpreter-program.

14. The computer-controlled printing press of claim 12 wherein the data copied by the interpreter-program is used by an operator or another program in detecting software errors.

15. The computer-controlled printing press of claim 12 where the data copied by the interpreter-program is used to simulate the operation of the printing press.

16. The computer-controlled printing press of claim 1 where the plurality of printing units are not identical.

17. The computer-controlled printing press of claim 1 where at least two of the printing units share mechanical parts.

18. The computer-controlled printing press of claim 1 where the computerized controller is part of a network of computers.

19. The computer-controlled printing press of claim 18 where the interpreter-program obtains data to be copied from the network.

20. A method of diagnosing errors in a computer-controlled printing press, the method comprising:

collecting data to form an image of selected interfaces;

ceding priority to a plurality of control programs in course of collecting said data;

protecting real-time operation of the computer-controlled operation from the operation of collecting data;

implementing run-time encapsulation to isolate the task of collecting data from the plurality of control programs;

copying said data to a reserved memory; and analyzing said data for faults and/or sub-optimal performance.

* * * * *